United States Patent [19]

Gspann

[11] 3,944,399

[45] Mar. 16, 1976

[54] METHOD OF PHYSICAL SEPARATION OF COMPONENTS OF A MOLECULAR BEAM

[75] Inventor: Jürgen Gspann, Buchig, Germany

[73] Assignee: Gesellschaft für Kernforschung mbH, Karlsruhe, Germany

[22] Filed: July 9, 1973

[21] Appl. No.: 377,253

[30] Foreign Application Priority Data

July 8, 1972 Germany ........................ 2233741

[52] U.S. Cl. .................................... 55/17; 55/392

[51] Int. Cl.$^2$ .................................... B01D 57/00

[58] Field of Search ........ 55/17, 277, 392; 137/823, 137/842

[56] References Cited

UNITED STATES PATENTS

| | | | |
|---|---|---|---|
| 3,405,736 | 10/1968 | Reader et al. | 137/842 |
| 3,616,596 | 11/1971 | Campaigue | 55/17 |

*Primary Examiner*—Charles N. Hart

*Attorney, Agent, or Firm*—Spencer & Kaye

[57] ABSTRACT

A method and apparatus for physical separation of the components of a molecular beam with different masses and/or gas kinetic cross sections. The molecular beam is crossed by one or more auxiliary gas beams so that its components are deflected by varying amounts.

22 Claims, 4 Drawing Figures

METHOD OF PHYSICAL SEPARATION OF COMPONENTS OF A MOLECULAR BEAM

BACKGROUND OF THE INVENTION

The present invention relates to a method and a device for the physical separation of components of a molecular beam with different masses and/or gas kinetic cross sections.

The molecular beams frequently used in science and technology consist of components of different masses and/or different gas kinetic cross sections. For instance, molecular beams are generated from mixtures of both light and heavy components with the object of accelerating the heavy component to the velocity of the light one. It is desired to then remove the light component as far as possible by separation. So far this problem has been solved by collimating the core section of the molecular beam (R. Klingelhofer, P. Lohse, "Production of Fast Molecular Beams Using Gaseous Mixtures." The Physics of Fluids, vol. 7, No. 3, pp. 379—381). However, in principle, it is possible only to enrich the heavier component in the core section, because the axes of the distributions of directions of the trajectories of both components coincide.

In another case of practical importance the molecular beam consists of molecular agglomerates of different sizes in which the molecules and atoms, respectively, are retained by van der Waals forces (condensed molecular beams). One method of the physical concentration of such beams moving in a vacuum is characterized in that the beam, which is already enriched in agglomerates, is deflected at a reflector of high surface quality, collimation of predetermined angular sections of the reflected total beam generating partial beams of different mean particle sizes (German Pat. No. 1,639,248). However, this gives rise to a loss of substance of the beam and an effective separation process requires both high surface quality and the maintenance of a reflector temperature which is specific with respect to the beam gas and a function of the respective range of sizes of the agglomerates.

SUMMARY OF THE INVENTION

It is the purpose of the present invention to offer a method of separating a molecular beam independent of the type of gas by mass and/or size of its particles and capable of producing the highest possible separation effect even in one stage, especially if the particles to be separated cannot be compressed in an intermediate stage.

In the present invention this problem is solved in that the molecular beam is crossed by one or more auxiliary gas beams as cross beams which deflect its components by varying degrees. In one embodiment of the method a lighter additional gas can be used to generate the molecular beam which is separated to a large extent by a collimator even before it meets the auxiliary gas beam or beams. In a preferred embodiment of the method according to the present invention the main axis or axes of the cross beam or cross beams cana be adjusted relative to the main axis of the molecular beam in such a way as to intersect under an angle of 90°.

The solution of the problem mentioned above is furnished also by a device characterized in that the molecular beam can be generated by means of a nozzle and by skimming with the collimator, the cross beam or cross beams can be injected into a vacuum chamber through one or more nozzles, the apertures of the nozzles and hence the main axes of the cross beams being capable of adjustment with respect to a maximum flow of the molecular beam. A catching device is arranged behind the point or points of penetration, and this device is equipped with at least one inlet diaphragm, and can be set relative to the main axis of the molecular beam.

In a preferred embodiment of the device according to the present invention the nozzles for the cross beams can be cooled and cross beam catchers can be arranged behind the penetration points in the direction of the main axes of the cross beams.

DESCRIPTION OF THE PREFERRED EMBODIMENTS

Condensed molecular beams are generated by transferring the core of a partly condensed supersonic flow into a high vacuum. They contain condensed matter in the form of agglomerates of atoms or molecules and are characterized by a high material flow density and by sharp physical boundaries.

Figure 1:
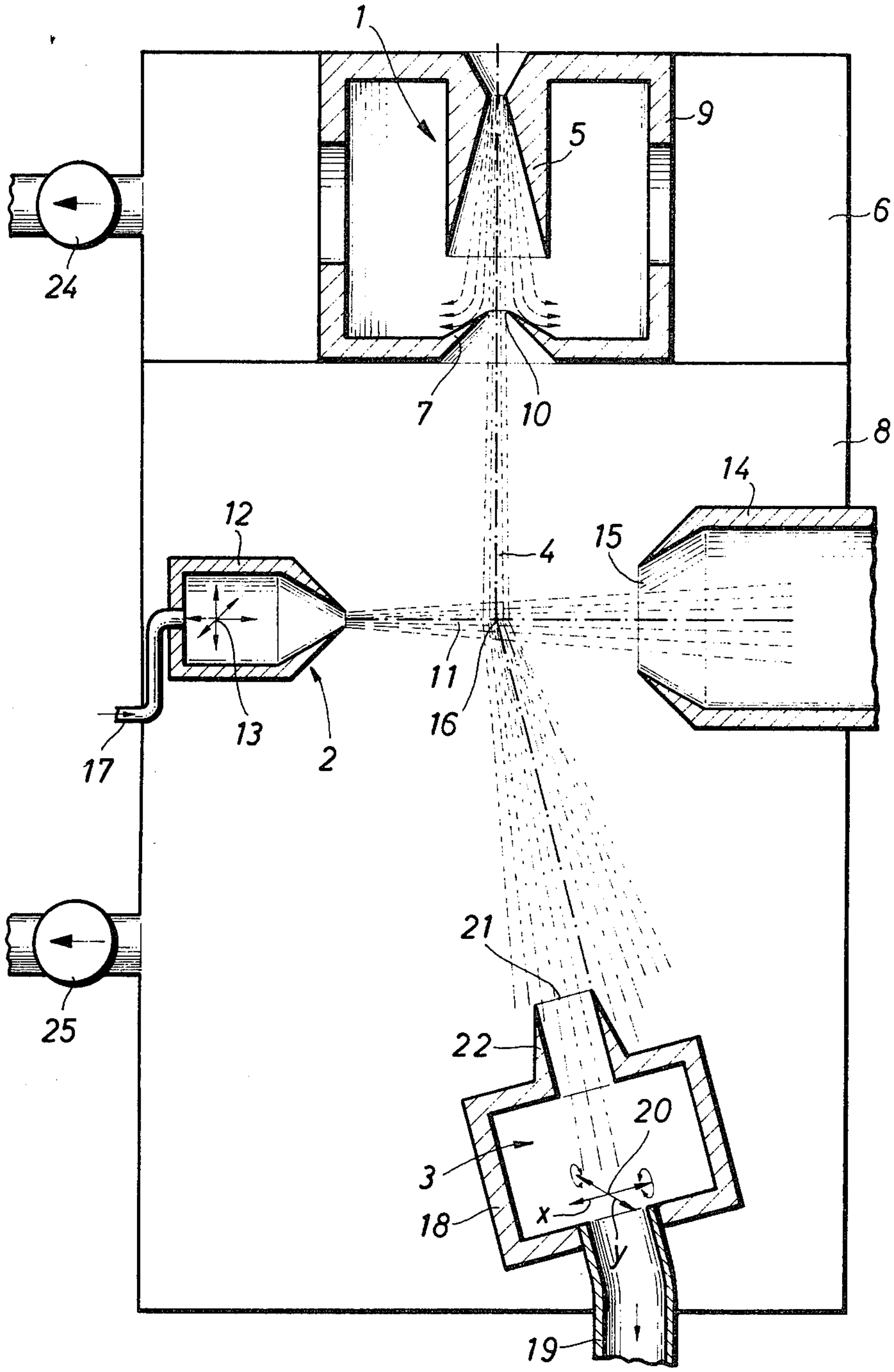
FIG. 1 is a schematic view of the arrangement of a separation plant.

The device for the execution of the method according to the present invention is schematically shown in FIG. 1. It includes the molecular beam generator 1, the cross beam system 2, and the catching device 3 for collecting or determining the size of particles of the molecular beam 4 or their velocity and for measuring the molecular flow density.

In the system 1 for the generation of condensed $N_2$-molecular beams 4 the molecular beam 4 (its main axis shown) enters a first pressure stage 6 through a conical nozzle 5, the pressure stage 6 being evacuated by means of a pump 24. The core of the partly condensed supersonic jet is transfered into the high-vacuum chamber 8 through the collimator 7, the high-vacuum chamber 8 also being evacuated by means of a pump 25.

In the present embodiment pure nitrogen is used as a molecular beam gas 4 which is precooled in a cryostat (not shown in more detail) by means of liquid nitrogen under atmospheric pressure. The nozzle 5 anad collimator 7 are assembled in one common turned copper part 9 which is flanged onto the bottom of the cryostat (not shown in more detail) also made of electrolytic copper. The gas feed to the nozzle 5 is sealed relative to the pressure stage 6 by an indium ring. In order to be able to work with a continuous beam, an aperture 10 of the collimator 7 of only 0.05 mm diameter can be used. In a preferred embodiment the entire beam generation system 1 is surrounded by a nitrogen cold trap.

The cross beam 11 (also the main axis shown) is generated by a convergent nozzle 12 which can be moved by means of a carriage 13 (shown schematically) crosswise, perpendicular and parallel to the cross beam 11 so that the latter can be adjusted to the maximum flow of the molecular beam 4 during operation. In order to minimize the pressure of the vacuum in the chamber 8 while the cross beam 11 is moved, $CO_2$ has been used as a cross beam gas in this embodiment which, after passing the molecular beam 4, is frozen up at the walls within a container 14 with the opening 15, which container 14 may be connected with an external cold trap (not shown in more detail) of the beam generation system 1. The container 14 is set up preferably immediately behind the penetration point 16 of the molecular and cross beams 4 and 11.

The nozzle prepressure of the cross beam 11 is measured through a pressure measuring line (not shown in detail) running parallel to the gas inlet line 17, for instance by means of a diaphragm manometer. In addition, the nozzle 12 is cooled so that the velocity can be minimized in order to obtain small impulses of the individual particles of the cross beam 11. In addition, the particles should be light so, when they collide with the particles of the molecular beam 4 in the area of the penetration point 16 (and the plane or volume, respectively, of penetration), the particles of the molecular beam 4 are deflected only by many collisions.

The catching device 3 for collecting or determining the size and velocity of the particles of the molecular beam 4 includes a collection vessel 18 equipped perhaps with a suction tube 19 for removal of the particles collected. The catching device 3 can be moved on a cross slide 20 or some similar device (schematically represented by arrows), for instance, in the *x–y* plane perpendicular to the main axis of the molecular beam 4. Moreover, it can be tilted both around the x-axis and the y-axis, the tip (aperture 21 of the inlet diaphragm 22) remaining the fixed point of reference in each case. Besides, a cooled area can be used instead of the collecting vessel 18 on which the separated molecular beam 4 is frozen.

For measuring the mass and the molecular flow density of the molecular beam 4, a sweeping field time-of-flight detector with a breaker disk and an ionization manometer tube with a conical inlet diaphragm may be attached to a cross slide. This can be moved into the beam 4 instead of the collection vessel 18.

Figure 2:
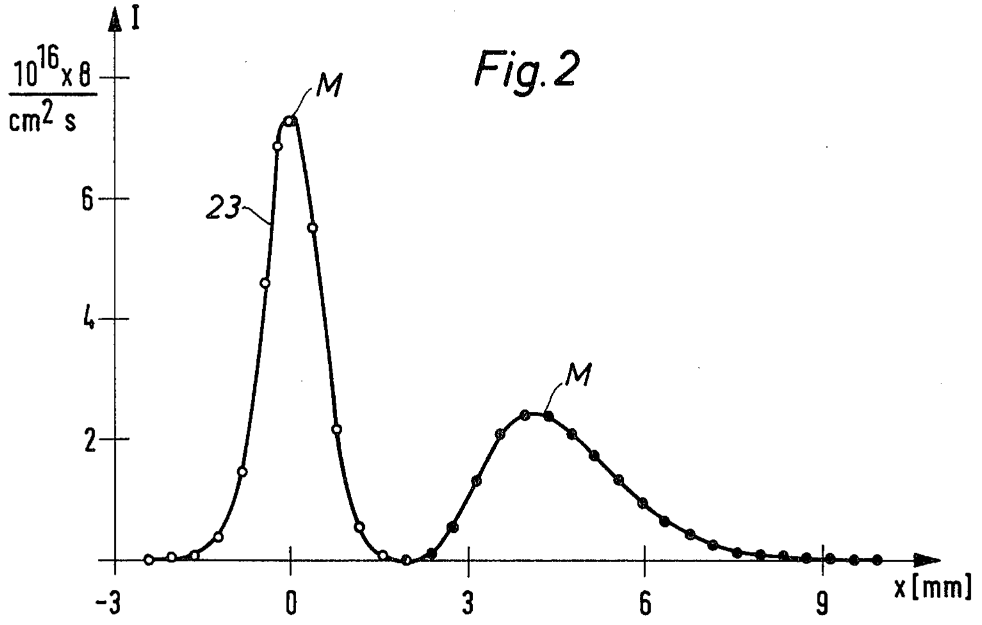
FIG. 2 is a graph showing the profile of the direct molecular beam and the shift of its peak in the direction of the axis of the cross beam.

The deflection of the molecular beam 4 by the cross beam 11 crossing it at right angles is represented in FIG. 2. It shows the profile 23 of the molecular flow density I of the molecular beam 4 at a nozzle prepressure $P_o = 500$ Torr in the direction of the cross beam 11. The cross beam 11 is generated by a multi-channel system which is 1 mm wide and 5 mm long in the direction of the main axis of the molecular beam 4. The diameters of the individual channels are 0.051 mm, the channel length is 3.5 mm, the transparency of the system (open area) 41 %. It is evident that the maximum M of the molecular beam 4 is deflected at a nozzle prepressure of $p = 15$ Torr of the cross beam 11. In this case the shift in the intensity peak M is directly proportional to the nozzle prepressure $P_o$ and, hence, proportional to the intensity I of the cross beam.

Figure 3:
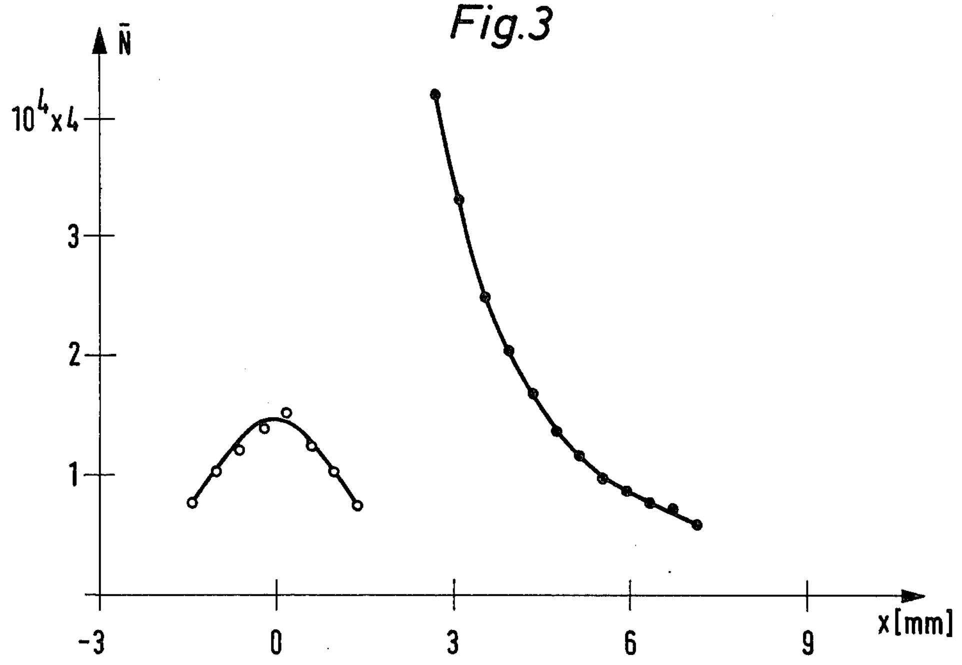
FIG. 3 is a graph showing the location dependence of the mean particle size of the direct and the deflected molecular beams.

A summary of the results achieved in determining the agglomerate mass at 500 Torr of nitrogen prepressure in the nozzle (using a multi-channel nozzle) is shown in FIG. 3. It indicates that the deflection and expansion of the condensed molecular beam 4 by the cross beam 11 at a $CO_2$ nozzle prepressure of 15.0 Torr is connected with a considerable decrease of the mean number $\bar{N}$ of molecules per agglomerate in the direction of the cross beam 11. Moreover, the velocity decreases with increasing deflection.

Figure 4:
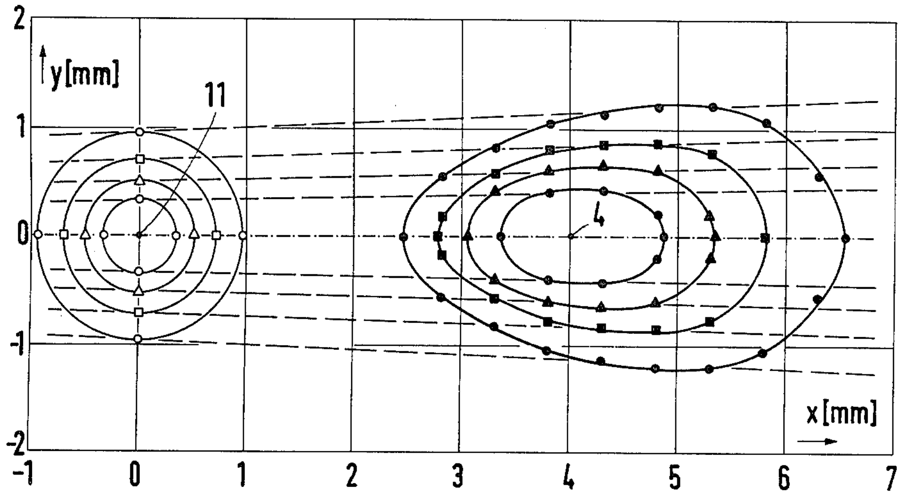
FIG. 4 is a cross section through a molecular beam and a cross beam in the area of the plane of penetration.

FIG. 4 shows lines of equal relative intensity I of the molecular beam 4 with and without a cross beam 11 (the respective main axes being shown in each case; with individual nozzles), referred to the respective maximum intensity M. The solid lines are lines of equal particle flow densities of the direct (hollow symbols) and the deflected molecular beams 4 (solid symbols). The particle flow densities as seen from the inside to the outside correspond to 0.8, 0.6, 0.4 and 0.2 times the maximum particle flow densities. Accordingly, the deflected molecular beam 4 is slightly expanded in the y-direction perpendicular to the axis of the cross beam 11, much more strongly in the x-direction with increasing deflection (generated by the collisions between the particles of the cross beam 11 and the molecular beam 4). The family of straight lines shown on the diagram indicates that this expansion is due only to the finite divergence of the cross beam 11.

The deflection of the molecular beam 4 by the cross beam 11 is due to a multitude of individual collisions whose resultant effect generates a pulse transfer in the direction of the relative motion between the molecular and the cross beams 4 and 11, respectively. It can be determined through an assessment of the resistance offered to the flow by a body immersed in that flow.

The method according to the present invention can be used to separate the agglomerates in condensed molecular beams according to their masses by a crossing supersonic free jet. This entails practically no loss in terms of agglomerated material. The slight expansion of the condensed molecular beam 4 in the direction perpendicular to the two beam 11 and 4 is due to the divergence of the supersonic free jet used and can be reduced or prevented by using a cross beam 11 whose lines of flow are as closely parallel as possible. This is achieved through the use of sufficiently long multi-channel systems (multi-channel nozzles) with a low prepressure of the cross beam 11. However, the divergence could be made use of in a very advantageous way also to focus the separated particles of the molecular beam 4. Since actually the agglomerates are separated by impulses, the theoretical limit of mass resolution is given only by the width of the velocity distribution of a certain mass of molecular beam.

The separation of particles of the molecular beam 4 can be increased by a multiple application of the collision method with cross beams 11. It is sufficient to arrange several nozzles (similar to nozzle 12) in series in the direction of the main axis of the molecular beam 4, preferably always perpendicular to its main axis. Of course, this will include cross beam catchers 14 which catch the particles of the cross beams 11 after their penetration through the molecular beam 4. These catching devices can also be arranged in a circle around the main axis of the molecular beam 4 and can be designed as cold traps. The direction of the main axis of the molecular beam 4 in this case may follow a circular or helical line. However, it is also possible any time to intersect the direction of the main axis or axes of the cross beam or cross beams 11 under an angle different from 90° with the main axis of the molecular beam 4.

What we claim is:

1. A method for physically separating components of a molecular beam with different masses and/or kinetic cross sections, comprising providing a molecular beam in a particular direction; intersecting said molecular beam with at least one auxiliary gas beam for deflecting the components of the molecular beam by varying degrees to separate them, and catching the separated components.

2. A method as defined in claim 1 wherein a lighter additional gas is used to generate the molecular beam, further comprising collimating the additional gas for separating it prior to the step of intersecting.

3. A method as defined in claim 1 wherein the main axis of the auxiliary beam is arranged with respect to the direction of the molecular beam so that the step of intersecting takes place at an angle of approximately 90°.

4. A method as defined in claim 1 wherein a plurality of auxiliary gas beams are arranged in series and intersect the molecular beam one after the other.

5. Apparatus for physically separating components of a molecular beam with different masses and/or kinetic cross sections, comprising:

main nozzle means for generating a molecular beam into a vacuum chamber;

collimator means for skimming the beam generated by said main nozzle means;

auxiliary nozzle means for injecting at least one auxiliary gas beam into the vacuum chamber in a direction to intersect the molecular beam and deflect the components of the molecular beam by varying degrees to separate them, said auxiliary nozzle means having at least one nozzle which is adjustable for adjusting the main axis of the auxiliary beam to provide maximum penetration of the molecular beam; and main catching means disposed in the path of the molecular beam and downstream of the place of intersection, said catching means having at least one inlet diaphragm and being adjustable with respect to the main axis of the molecular beam to catch the separated components.

6. Apparatus as defined in claim 5 further comprising suction means for attachment to said main catching means and for removing the particles of the molecular beam.

7. Apparatus as defined in claim 5 wherein the auxiliary nozzle means has a plurality of nozzles which are convergent.

8. Apparatus as defined in claim 5 wherein the auxiliary nozzle means includes multi-channel nozzles.

9. Apparatus as defined in claim 5 further comprising means for cooling the nozzle of said auxiliary nozzle means, auxiliary catching means disposed in the path of the main axis of the auxiliary gas beam and downstream of the place of intersection.

10. Apparatus as defined in claim 9 wherein the auxiliary catching means includes a cooled cup having an inlet aperture.

11. Apparatus as defined in claim 9 wherein the auxiliary catching means is arranged as a ring around the main axis of the molecular beam.

12. Method for physically separating components of a molecular beam with different masses and/or kinetic cross sections, comprising:

generating a molecular beam into a vacuum chamber;

injecting at least one auxiliary gas beam into the vacuum chamber in a direction to intersect the molecular beam and deflect the components of the molecular beam by varying degrees to separate them;

adjusting the main axis of the auxiliary beam to provide maximum penetration of the molecular beam; and catching the separated components of the molecular beam downstream of the place of intersection with adjustable catching means.

13. Method as defined in claim 12 wherein a lighter additional gas is used to generate the molecular beam, and further comprising collimating the additional gas to separate it from the molecular beam prior to injecting the auxiliary gas beam.

14. Method as defined in claim 12 further comprising removing the separated particles of the molecular beam from the catching means by suction.

15. Method as defined in claim 12 wherein the auxiliary gas beam is injected into the vacuum chamber through an auxiliary nozzle means having a plurality of nozzles which are convergent.

16. Method as defined in claim 12 wherein the auxiliary gas beam is injected into the vacuum chamber through auxiliary nozzle means having multi-channel nozzles.

17. Method as defined in claim 12 further comprising catching the auxiliary gas beam downstream of its place of intersection with the molecular beam.

18. Method as defined in claim 17 wherein the auxiliary gas beam is caught in a cooled cup.

19. Apparatus as defined in claim 17 wherein the auxiliary gas beam is caught in auxiliary catching means arranged as a ring around the main axis of the molecular beam.

20. Method as defined in claim 12 wherein the auxiliary gas beam is cooled before it intersects the molecular beam.

21. Method as defined in claim 12 wherein a plurality of auxiliary gas beams are arranged in series and intersect the molecular beam one after the other.

22. Method as defined in claim 12 wherein the main axis of the auxiliary beam is arranged with respect to the direction of the molecular beam so that the step of intersecting takes place at an angle of approximately 90°.

* * * * *